June 5, 1962 K. M. MacDOWELL ETAL 3,038,068
TRANSMIT-RECEIVE SYSTEM USING A SUPERREGENERATIVE
TRAVELING WAVE AMPLIFIER-OSCILLATOR
Filed Dec. 10, 1956 3 Sheets-Sheet 1

INVENTORS
KENNETH M. MACDOWELL
ROBERT A. RAPUANO
BY Elmer J. Gorn
ATTORNEY

INVENTORS
KENNETH M. MACDOWELL
ROBERT A. RAPUANO
BY Elmer J. Gorn
ATTORNEY

TRANSMIT-RECEIVE SYSTEM USING A SUPERREGENERATIVE TRAVELING WAVE AMPLIFIER-OSCILLATOR

Filed Dec. 10, 1956 3 Sheets-Sheet 3

INVENTORS
KENNETH M. MACDOWELL
ROBERT A. RAPUANO
BY [signature]
ATTORNEY

United States Patent Office 3,038,068
Patented June 5, 1962

3,038,068

TRANSMIT-RECEIVE SYSTEM USING A SUPER-REGENERATIVE TRAVELING WAVE AMPLIFIER-OSCILLATOR

Kenneth M. MacDowell, West Newton, and Robert A. Rapuano, Dedham, Mass., assignors to Raytheon Company, a corporation of Delaware Filed Dec. 10, 1956, Ser. No. 627,725
19 Claims. (Cl. 250—13)

This invention relates to a traveling wave electron discharge device of the backward wave type adapted to operate as a superregenerative amplifier of electromagnetic signals and, additionally, as an oscillator to transmit response signals of a predetermined pattern upon superregenerative amplification and reception of said electromagnetic signals, and more particularly, to a system for applying superregeneration to one or more voltage tunable backward wave devices and for controlling the mode of operation of said devices to receive and amplify electromagnetic signals in the superregenerative mode and to retransmit signal energy at substantially the same frequency as said received electromagnetic signals.

In traveling wave devices of the backward wave type in which electrons are projected in an extended stream in the vicinity of a wave propagating structure, oscillatory energy is produced by the interaction or feedback of energy from the electron stream to a backward wave which propagates along the wave propagating structure, commonly referred to as a wave interaction path or a signal transmission network, at a velocity substantially equal to that of the electron stream. As is known, the frequency of oscillations generated as a result of such interaction or feedback can be controlled by varying the velocity of the electron stream above or below a particular value substantially equal to the velocity of the backward wave, the oscillatory energy so generated being extracted from said signal transmission network by coupling means at one end thereof.

Also, as is generally known, a feedback wave device or tube commences oscillation when its gain-feedback ratio exceeds the value required to sustain oscillation or when the electron beam current exceeds a critical value, which, for convenience, may be designated as $I_0$, while the device functions as a narrow band voltage-tunable backward wave conventional amplifier when the aforesaid beam current is adjusted below this value. Furthermore, oscillations at a beam current above the value $I_0$ for a given voltage representing a particular beam velocity occur at substantially the frequency at which the device has peak amplification when the beam current is below the critical value $I_0$, the beam velocity being held substantially constant. The advantages of this particular operational characteristic in which the backward wave tube, when in a transmitting mode of operation, is capable of initiating oscillations at substantially the same frequency as when the tube is in the receiving mode of operation, is more readily appreciated when at attempt is made to improve the regenerative gain and bandwidth of the device by adapting it for use as a novel superregenerative signal amplifier which is actuated by a received signal to amplify said signal in the superregenerative mode and, additionally, to generate response signals bearing a predetermined frequency relationship to the frequency of the received signals.

In accordance with the present invention, signal energy is introduced into the wave interaction path of a backward wave tube operating in a region of relatively high regeneration and approaching the state of oscillation, the oscillations produced in the backward wave tube depending upon the amplitude of the introduced signal energy.

After being driven into oscillation, the backward wave tube is then interrupted or periodically driven to a non-oscillatory condition. For example, this may be accomplished by changing the anode current to a value below that required to sustain oscillation, thereby returning the tube to the state of high regenerative gain to provide a large gain-bandwidth factor improvement over conventional regenerative amplifier operation. It should be understood, that for periodically interrupting the oscillatory mode of the tube, a separate "quench" oscillator may be employed to effect periodic changes in the anode current, or the tube itself can initiate these changes by feeding back to the wave interaction path a portion of the rectified signal output.

The invention further discloses a method in which a backward wave tube is caused to sweep cyclically and with substantially constant sensitivity in the superregenerative mode through a predetermined frequency band until an incoming signal is encountered and amplified in said tube. The superregenerative output thus produced in said tube is then made effective to halt the sweeping of said tube, to increase the beam current of the electron stream flowing adjacent the signal transmission network of said tube to a value substantially above the current required to operate in the superregenerative mode of oscillation and to transmit a predetermined response signal of relatively high power for a given length of time at substantially the same frequency as the received signal.

The invention also discloses a novel method of applying amplitude modulation or frequency modulation, which may be in the form of noise, to the appropriate electrodes of the backward wave oscillator tube. Amplitude modulation is also achieved concurrently with frequency modulation to produce a wideband noise modulated signal by simultaneously applying both frequency modulation and amplitude modulation to the oscillator tube.

Other objects and features of this invention will be understood more clearly and fully from the following detailed description of the invention with reference to the accompanying drawings wherein.

Figure 1:
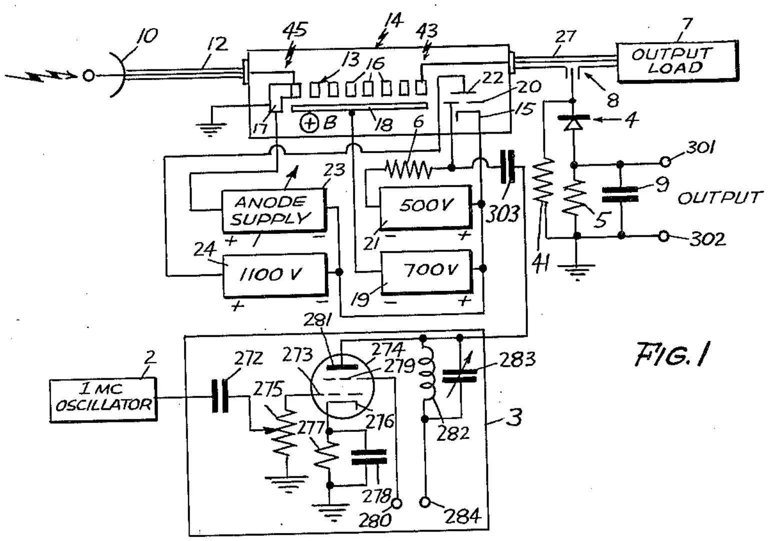
FIG. 1 is a schematic diagram of a traveling wave superregenerative amplifier provided with a separate oscillation interrupting means in accordance with the invention.

Referring now to FIG. 1 showing the schematic diagram of the backward wave tube used as a superregenerative amplifier, an antenna 10 is provided to couple recurring signal pulses, such as radio pulses, communication signals, radar signals, and the like by coaxial transmission line 12 to the end remote from the electron source of the signal transmission network 13 of superregenerative backward wave tube 14.

The traveling wave tube superregenerative amplifier-oscillator tube 14, as shown, includes a grid 20, an acceleration electrode 22 and a cathode 15 positioned at the other end of the signal transmission network 13 and provided with a heater, not shown. The purpose of the cathode 15 is to emit electrons which, under the influence of the proper electrostatic and magnetic fields produced in the space adjacent the signal transmission network, will move along paths adjacent a series of interdigital fingers 16 forming said network and, after amplifying any signal present in the network through interaction therewith, will impinge on collector electrode 17 or on the signal transmission network 13, which serves as an anode. Signal transmission network or wave interaction path 13 is maintained at the same potential as the collector electrode 17, or at some other potential relative to the cathode. The structural details of the cathode 15, collector electrode 17 and the remaining elements and electrical connections comprising the backward wave tube 14 will be described below. Extending adjacent interdigital fingers 16 and forming a space through which the electron beam travels, is an elongated electrode 18, commonly referred to as a sole, which, in this embodiment, is maintained negative with respect to the cathode 15 by a 700 volt power supply 19.

The grid or control electrode 20 is maintained negative with respect to the cathode by a 500 volt power source 21 and, at the same time, provides a means for controlling the value of the anode current and for interrupting or quenching the backward wave oscillations of tube 14. The collector electrode 17 is connected to an anode supply 23, as shown in FIG. 1, and the acceleration electrode 22 is connected to a 1100 volt power supply 24 which determines whether the beam current will remain above or below the aforementioned $I_0$ value in a manner which will be described in detail below. It should be noted that superregeneration is accomplished in the circuit shown in FIG. 1 by controlling the beam current by providing circuits which control the potential of grid 20 instead of acceleration electrode 22.

In accordance with the invention, a separate quench oscillator or signal generator 2, in this embodiment of the invention, provides a sinusoidal voltage output at a frequency of 1.0 megacycle per second which is amplified in a conventional manner by a quench amplifier 3. The output of quench amplifier 3 is developed across isolation resistor 6 and is fed to the control electrode 20 to vary the output of bias supply 21 and, in turn, to interrupt or quench the oscillation of tube 14. As is known, the bandwidth of the superregenerative amplifier will be determined by the rate at which the quench voltage travels in and out of regenerative amplification and oscillation. In general, the faster the rate, the wider the bandwidth. For the same quench or interrupting wave form, less time is spent in the regenerative or sensitive part of the cycle at the higher quench frequencies. For example, a 10 microsecond pulse having a 1.0 kilocycle repetition rate can be amplified using the aforementioned 1.0 megacycle per second sine wave quench frequency. However, if it is desired to amplify radar pulses of .20 microsecond, the quench frequency would be approximately 50 megacycles, and the amplifier would have a bandpass of at least 5 megacycles. Also, the greater the range of amplitude of signals to be handled, the lower the Q, and the broader should be the bandpass of the amplifier. In short, the Q of the quench amplifier should be low enough to take care of the relatively small variations of quench frequency which normally occur with signal amplitude variation.

In operation, therefore, signal energy and oscillator energy are fed to the wave interaction path of the backward wave amplifier. The ideal quenching cycle consists of a short period of forcing the regenerative backward wave amplifier into a quenched state, followed by a relatively long period of leaving the amplifier in a state of high regenerative gain, commonly referred to as the sensitive period. The amplifier is then driven into oscillation, the duration of the oscillation, in this embodiment of the invention, being determined by the received signal amplitude in the wave interacton path of tube 14. It should be understood that the time of the complete amplification-oscillation cycle should be substantially less than the period of one cycle of the highest modulation or interrupting frequency.

For optimum sensitivity, the cyclical quench voltage may be adjusted so that the relatively flat slope portion of the sine wave is effective to drive the tube in and out of oscillation. This adjustment is accomplished by changing the value of the anode supply voltage or the amplitude of the quench voltage sine wave.

The output of superregenerative amplifier tube 14 is fed by a coaxial output line 27 to a coaxial load circuit 7 adapted to terminate the coaxial line 7 in its characteristic impedance. The output load may be a directive radiating antenna, an additional amplifying stage, a direct view indicting device, such as a neon lamp or cathode ray tube, or a conventionl signal detector. A radio frequency probe 8, providing approximately 40 db attenuation and having a direct current return path through resistor 41, feeds radio frequency energy to the diode rectifier 4 which produces a modulated signal output across the 100,000 ohm resistor 5 and a 100 micromicrofarad filter condenser 9. The condenser 9 filters out the 1.0 megacycle component in the detected signal and leaves the detected modulation from the input signal at antenna 10. This modulation has an upper frequency in the order of the quench frequency. The signal output, therefore, is a detected signal which is connected to output terminals 301 and 302 and, if desired, can be fed to a conventional amplifier.

As shown in FIG. 1, interruption of tube 14 is accomplished by the signal generator or conventional oscillator 2 which feeds the 1.0 megacycle signal to the quench amplifier 3 which consists of an input capacitor 272 connected to grid 273 of a 3D21 type tube 274 which is provided with an input potentiometer 275 for adjusting the amplitude of the driving voltage. The cathode 276 of tube 274 is connected to a 100 ohm bias resistor 277 and is shunted by a .01 microfarad bias capacitor 278. The screen grid 279 of tube 274 is connected to a source of 300 volts at terminal 280, while the plate 281 of said tube is connected to a parallel resonant circuit comprising an inductance 282 and a variale capacitor 283 tuned to a 1.0 megacycle signal frequency and, in turn, connected to a source of 800 volts at terminal 284. The amplified signal is coupled through coupling capacitor 303 to the grid 20 of backward wave tube 14. The value of the output voltage required to drive the tube 14 out of oscillation is approximately 50 volts which is superimposed upon the minus 500 volts grid bias supply voltage. The output of the signal generator or quench oscillator 2 may be varied to provide the minimum drive necessary to interrupt oscillation of tube 14, thereby providing optimum signal sensitivity.

Figure 2:
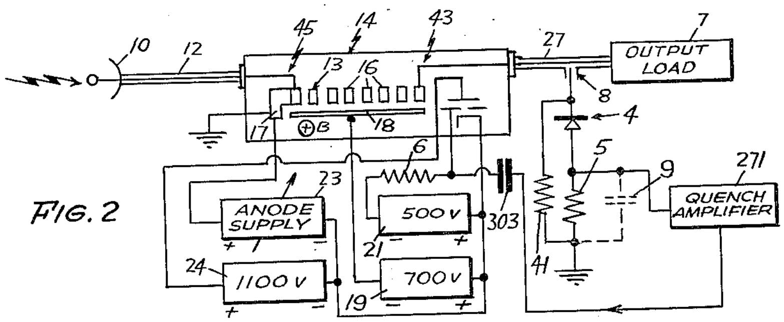
FIG. 2 is a schematic diagram of a traveling wave superregenerative amplifier provided with a self-quenching or interrupting means according to the invention.

While FIG. 1 shows a separate quenching oscillator 2 for interrupting the oscillation of tube 14 in the superregenerative mode of operation, FIG. 2 shows a circuit in which the oscillation in backward wave tube 14 is self-quenched or interrupted without the necessity for providing a separate quench oscillator. In this embodiment, the frequency of the quench oscillation depends upon the time constant of the feedback circuit. FIG. 2 shows the detecting diode 4 which, in response to oscillation of tube 14, produces a detected output signal across the resistor 5 and charges condenser 9 which, in this case, has an impedance of ten times the value of resistor 5 at the 1.0 megacycle quench frequency. Resistor 41 is the direct current return path for the probe 8. Thus, signal energy is fed back through a multistage amplifier 271, each stage having similar components, and through the coupling capacitor 303 to operate in conjunction with isolation resistor 6 and bias supply 21 to quench backward wave tube 14. The charge on condenser 9 is gradually dissipated by resistor 5 to a value which will no longer interrupt oscillation and the cycle is repeated.

Figure 3:
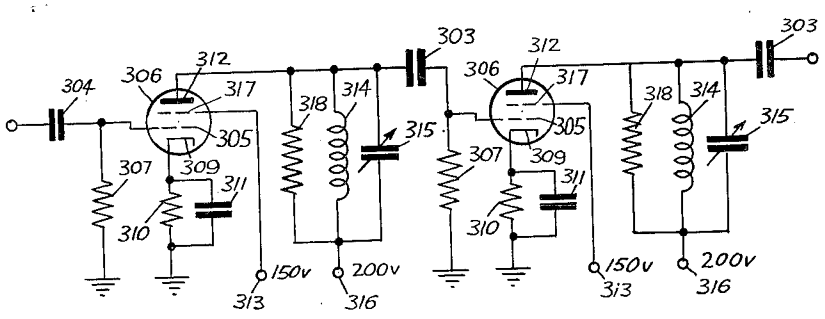
FIG. 3 is a circuit diagram illustrating the quench amplifier shown in FIG. 2.

Referring now to FIG. 3, a conventional multistage voltage amplifier is shown having a voltage gain of approximately 80 db. This amplifier is used to amplify the relatively small rectified signal output appearing across resistor 5 and is also used as an automatic sensitivity control amplifier in a manner which will be described in detail below.

The signal output across resistor 5, which is approximately 50 millivolts, is fed through an input capacitor 304 to grid 305 of each 6AK5 pentode type tube 306 provided with a one meg ohm grid bias resistor 307 and having a suppressor grid 308 tied to cathode 309 which is connected to cathode bias resistor 310 and bias condenser 311 and ground. The screen grid 317 of tube 306 is provided with approximately 150 volts of direct current at terminal 313. The plate 312 of tube 306 is connected to a tuned circuit comprising an inductance 314 and a variable capacitor 315 which is tuned to the frequency of the 1.0 megacycle signal to be amplified. The plate 312 is also connected to a source of approximately 200 volts direct current at terminal 315. Coupling capacitor 303 feeds the amplified signal to the control grid 20 of backward wave tube 14. It should be understood that tube types other than the 6AK5 tube may be used, and any number of stages can be added to the amplifier to obtain a voltage gain of 80 db and a bandwidth in excess of 100 kilocycles. In order to insure the amplifier 271 maintains a bandwith in excess of 100 kilocycles to attain optimum performance, a broad banding 50,000 ohms resistor 318 is shunted across the resonant circuit in each stage. The resistor can be removed from each stage to provide an amplifier having increased gain and a correspondingly narrower bandwidth for use as an automatic sensitivity control amplifier in connection with the cyclical sweeping of tube 14 through a predetermined frequency band in a manner which will be described in detail below.

Figures 4, 5, 6:
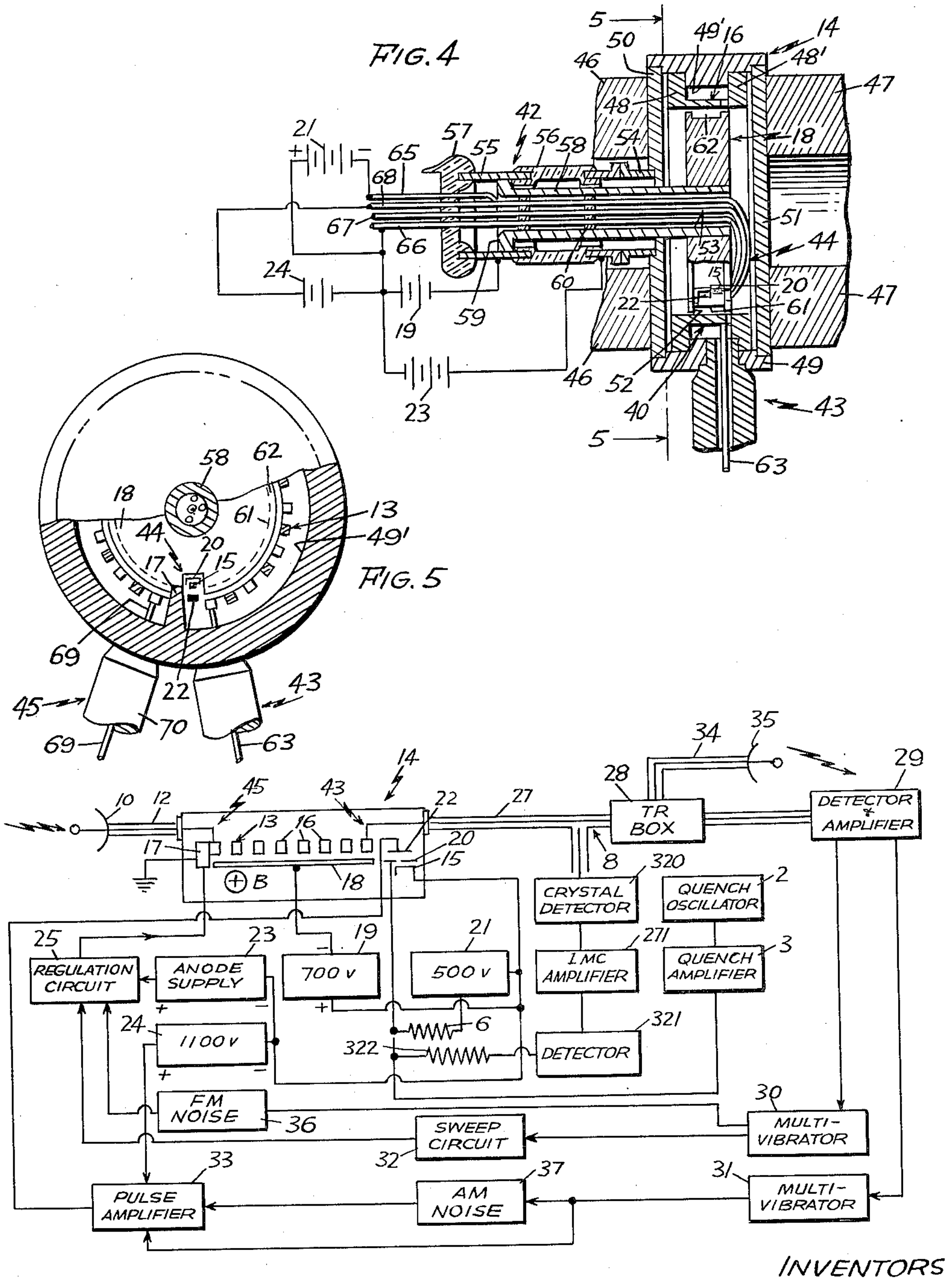
FIG. 4 is a detailed view of a portion of the anode assembly of a backward wave superregenerative oscillator tube employing a transverse magnetic field.
FIG. 5 is a section view taken along the line 5—5 of FIG. 4.
FIG. 6 is a schematic diagram of a traveling wave superregenerative amplifier oscillator sweep system according to the invention.

Referring now to FIGS. 4 and 5, the construction details shown therein do not form a part of the invention and are not described in detail. They are, however, shown and described in detail in the copending application for "Electrical Systems," Serial No. 562,472, of Edward C. Dench and Albert D. La Rue, filed January 31, 1956. In FIGS. 4 and 5, a backward wave tube 14 is shown which comprises an anode assembly 40 which includes the energy propagating structure or signal transmission line including interdigital fingers 16, the elongated electrode or sole 18 which, as noted, is maintained negative with respect to the interdigital fingers forming anode delay line 13, a lead-in assembly 42 and an output coupling means 43. In addition, there is shown an electron gun mounting assembly 44 including the cathode 15 containing a heater, not shown, a control grid 20, an input coupling means 45 for the coaxial transmission line 12 of FIGS. 1 and 2, and a transverse magnetic field-producing means 46—47, a portion of which is indicated in FIG. 4.

The interdigital fingers 16 comprising the signal transmission line include a plurality of members which extend from oppositely-disposed annular members 48, 48', respectively. These members are secured by screws, not shown, to the shoulder portion of a cylindrical thermally-conductive ring 49—49' to which is hermetically sealed a pair of oppositely-disposed cover plates 50 and 51.

The sole 18 consists of a cylindrical block of material, such as copper, having a centrally-located aperture 53 to permit connection of lead-in assembly 42 and to allow for passage of external circuit-connecting leads.

Referring more particularly to FIG. 4, the lead-in assembly 42 comprises an electrically-conductive cylindrical sleeve 54, which is inserted in an aperture in cover plate 50. Interconnecting metal sleeve 54 and outer metal sleeve 55 is a section of cylindrical glass tubing 56. The other end of sleeve 55 is provided with a glass seal 57 for sealing the tube 14 after evacuation. The assembly 42 is arranged perpendicularly to cover plate 50 of tube 14 and further includes an elongated electrically-conductive tubular supporting cylinder 58, which serves as a main support for sole 18 and is affixed at one end to the periphery of aperture 53 in sole 18. The outward end of cylinder 58 contains an outwardly flared portion 59, which is connected to the inner surface of outer metal sleeve 55. The necessary leads for the electron gun are fed through supporting cylinder 58 and are insulatedly supported therefrom by one or more glass beads 60. The interdigital fingers comprising the signal transmission line 13 are arranged concentrically with sole 18 and are separated from the circumferential wall 61 of the sole to form an interaction space 62 through which the stream of electrons generated in the tube passes. The interdigital delay line or signal transmission network 13 including interdigital fingers 16 may be terminated at one end by attenuation, which may be in the form of an energy dissipative material, such as iron, applied to the fingers. The coaxial output coupling means 43 is sealed in an opening of wall 49 of the anode and is impedance-matched to the interdigital delay line 13. The inner conductor 63 of coaxial output coupling means 43 is connected to a finger at or adjacent the end of the periodic anode delay line 13 adjacent the electron gun.

The backward wave tube 14 may be provided with a collector electrode 17, as shown in FIG. 5, for intercepting electrons after one traversal of the arcuate interaction space. This collector electrode may take the form of a projection from the back wall 49' of the interdigital delay line 13. In some instances, however, the collector electrode may be omitted and the electron stream made reentrant. Furthermore, the sole 18 may be either primarily or secondarily electron-emissive.

Electron gun assembly 44 for the backward wave tube, shown in FIGS. 4 and 5, includes the grid 20, the cathode 15 with a heater inserted therein, not shown, and an acceleration electrode 22, as shown in FIG. 4. More particularly, the cathode 15 is shown, by way of example, as a rectangular body provided with a circular bore, not shown, in which the heater is inserted. The cathode body 15 has at least the surface facing the accelerating anode 22 coated with an electron-emissive material, such as a compound of barium. Cathode 15 is positioned within the wall 61 of sole 18. The cathode lead 66 is connected electrically to the cathode 15. One end of the heater, not shown, is connected to the inner wall of the cathode body, while the other end of the heater is attached to the heater lead 67, shown in FIG. 4.

The auxiliary electrode 22 which, in effect, is an accelerating anode serving to aid in the production of the desired electron beam trajectory, is insulatedly supported from flange portion 52 of sole 18. The auxiliary electrode lead 68 is attached to the auxiliary electrode 22.

A suitable electric field between anode and sole may be obtained by means of a voltage applied therebetween. The sole 18 may be negatively biased with respect to the cathode by means of the supply source 19 of voltage connected between the cathode lead 66 and tubular sleeve 58, by way of metal sleeve 55. The cathode may, in some applications, be at the same potential as the sole. The grid 20 may be maintained at negative potential with respect to the cathode by grid supply source 21 of voltage connected between cathode lead 66 and grid lead 65, only partially shown in FIG. 4. Similarly, the signal transmission network or anode delay line 13, as shown in FIG. 5, is maintained at a positive potential relative to the sole and cathode by means of anode supply source 23 of voltage connected between metal sleeve 54 and cathode lead 66. As noted, the auxiliary or acceleration electrode 22 is connected to a positive potential relative to the cathode by means of supply source 24 of voltage connected between leads 66 and 68.

A uniform magnetic field transverse to the direction of propagation of the electron beam is provided either by a permanent magnet or an electromagnet having cylindrical pole pieces 46 and 47 radially positioned on or adjacent the tube. Pole piece 46 is apertured to receive the lead-in assembly 42 and pole piece 47 is apertured to maintain symmetry of the magnetic field. The flux lines should be concentrated in the interaction space 62 between sole 18 and cylindrical transmission network 13. By proper adjustment of the magnitude and polarity of the magnetic and electric fields, the electron beam may be made to follow a circular path about interaction space 62 under the combined influence of these transversely disposed fields.

As noted, the radio frequency energy generated in the interaction space 62 traveling along signal transmission line 13 sets up a high frequency electromagnetic field which may be analyzed as a series of space harmonics, some of which travel in one direction (clockwise) along the anode structure, the others of which travel counterclockwise, and all of which travel with differing phase velocities. If the electron beam is synchronized with the proper space harmonic, interaction of the beam and the space harmonic will result in the production of oscillations within the tube. The oscillations can be controlled by changing the electron beam current above or below the critical value $I_0$, thereby selecting the mode of operation of the tube, that is, of amplifications or oscillations. The energy travels through the aforementioned space toward the electron gun and is extracted at the gun end of the signal transmission line 13 by way of the coaxial output line 43.

Backward wave tube 14 further includes the input coupling assembly 45 comprising an inner conductor 69 and an outer conductor 70 coaxially arranged with respect to one another. The inner conductor 69, as shown in FIG. 5, is connected to one of the fingers 16, as shown in FIG. 1, at or adjacent the end of the anode transmission line 13 electrically removed from the electron gun, while the outer conductor 70 may be attached to the cylindrical wall 49 of anode assembly 41. The input coupling means 45, as well as the output coupling means 43, need not be coaxial; for example, the energy may be coupled to or from signal transmission line 13 by means of a wave guide.

It should be understood that the delay line or signal transmission network 13 may not be of the interdigital type, but may be any suitable periodic delay structure such as a helix, disc-loaded waveguide, or the like. Tuning of the backward wave oscillator may be accomplished by varying the voltage between the signal transmission line 13 and sole 18, as will be described in detail below. However tuning of the backward wave tube 14, also, may be accomplished by varying the magnetic field strength, either by varying the position of the magnet pole pieces in the case of a permanent magnet or by varying the electric current in the case of an electromagnet having a coil surrounding the core. Variation of both the electric field and the magnetic field simultaneously, of course, is possible.

Referring now to FIG. 6, there is shown a diagram of a backward wave superregenerative oscillator amplifier system in which voltage tuning of the backward wave tube is accomplished by effectively changing the sole-to-anode voltage by control of the cathode-to-anode voltage by means of a regulation circuit 25, the sole being maintained at a constant voltage reference with respect to the cathode. In like manner, the aforementioned transmitting or receiving mode of operation of the backward wave tube is selected by raising or lowering the accelerator voltage with respect to the cathode by control of an 1100 volt power supply 24 by means of a pulse amplifier circuit 33, which apart from superregeneration regulates the beam current above or below the aforementioned $I_0$ value in a manner which will be described in detail below. It should be noted that, for superregeneration oscillation is controlled by providing the aforementioned quench circuits which control the potential on the grid 20. Thus, if a signal is injected by means of a coaxial line 12 into the backward wave oscillator, the anode current being reduced somewhat below the point of oscillation, the input signal will be amplified. Apart from superregenerative operation, the backward-wave interaction permits the tube 14 to act as a regenerative amplifier in which the frequency at which maximum gain occurs depends upon the anode-to-sole voltage and, as noted, is very close to the frequency at which the tube delivers an output when oscillating.

In like manner, the signal amplified in backward wave tube 14 is extracted by an output coupling device 43 and fed through a coaxial output line 27 to a conventional duplexer or TR box 28 and, thence, to a standard detector and amplifier circuit 29, the output of which is a detected high-frequency gate signal which is fed to a pair of multivibrators 30 and 31 in the form of positive and negative voltage pulses, respectively. The output of multivibrator 30, which is a conventional one-shot multivibrator, applies a negative gate pulse to terminate the operation of a sweep generator 32, thereby holding its sawtooth voltage output at a voltage level corresponding to the frequency of an incoming signal in tube 14 during its operation as a voltage swept amplifier. Thus, the sawtooth voltage output from sweep generator 32 is fed to the voltage regulation circuit 25 which controls the value of the voltage applied from anode supply 23 to the anode 13 to cause frequency scanning of tube 14. When during the scanning of a given frequency spectrum by said voltage tuning, an object signal is encountered, the aforementioned amplified signal output is present in the output coupling 43 of tube 14 and is used to stop the scanning voltage of sweep generator 32 at the precise value existing when the object signal occurred and, in this manner, the amplifier is locked to the object signal. Simultaneously, with the halting of the scanning voltage output of sweep generator 32, an output pulse is fed from multivibrator 31 to the pulse amplifier 33 to gate a positive voltage pulse of predetermined length from accelerator supply source 24 to acceleration anode 22, thereby to increase the beam current of amplifier tube 14 above the value $I_0$ and to initiate oscillation at substantially the same frequency as that at which the incoming object signal occurred. In this manner, multivibrator 31 determines the length of time oscillations are generated in tube 14. This oscillatory energy is fed to TR box 28, which operates in a conventional manner to feed the energy through an antenna coaxial line 34 to an antenna 35 which radiates the energy into space in the opposite direction from the incoming signals.

In accordance with the invention, the backward wave tube 14 is made to sweep over a predetermined frequency band in the superregenerative mode by providing the aforementioned quench oscillator 2 and quench amplifier 3 to control the bias voltage applied to grid 20 from bias source 21 applied through isolation resistor 6. However, the oscillation starting current and, therefore, the current for equal regenerative gain is not constant over the entire band of frequencies through which tube 14 is swept. In order to establish constant sensitivity over a given frequency band, an automatic sensitivity control circuit is provided by amplifying the quench signal component from probe 8 and crystal detector 320 by means of the 1.0 megacycle amplifier 271, as shown in FIG. 3, rectifying the output by means of a detector 321 and feeding the output of said detector through isolation means 322 to the grid 20 of tube 14. Thus, in operation, as the 1.0 megacycle quench signal output decreases, the output of detector 321 becomes less negative which increases the anode current to a value which again returns tube 14 to a high sensitivity state at the new frequency. Since the grid 20 has a transconductance in the order of 200 microamperes per volt, reasonably constant sensitivity over the sweep frequency band is obtained when using a maximum rectified quench voltage of approximately 100 volts. This arrangement is an effective automatic gain control which provides for optimum operation in response to both weak and relatively strong input signals.

At the same time as oscillations are being generated in backward wave tube 14, multivibrator 30 feeds a gate pulse to FM noise generator 36, the output of which is used to frequency-modulate tube 14 by controlling the cathode-to-anode voltage by means of regulation circuit 25. The FM noise modulation could also be applied in other embodiments of this invention in the circuit of sole 18. In like manner, the output of multivibrator 31 is used to gate AM noise generator 37 to actively produce and apply AM noise to pulse amplifier 33 to initiate a noise-modulated output at the acceleration electrode 22. In other embodiments, it should be understood that this AM noise signal could be applied in the circuit of control grid 20 after superregenerative operation has ceased. It should be noted that a delay can be inserted between the time the device locks on the received signal and the time tube 14 is made to transmit, which, in particular communication applications, may be desirable. Additionally, the backward wave tube can be actuated to transmit a narrow band or a wide band noise-modulated signal, depending on whether amplitude modulation, frequency modulation or a combination of the two are applied to the tube.

Figure 7:
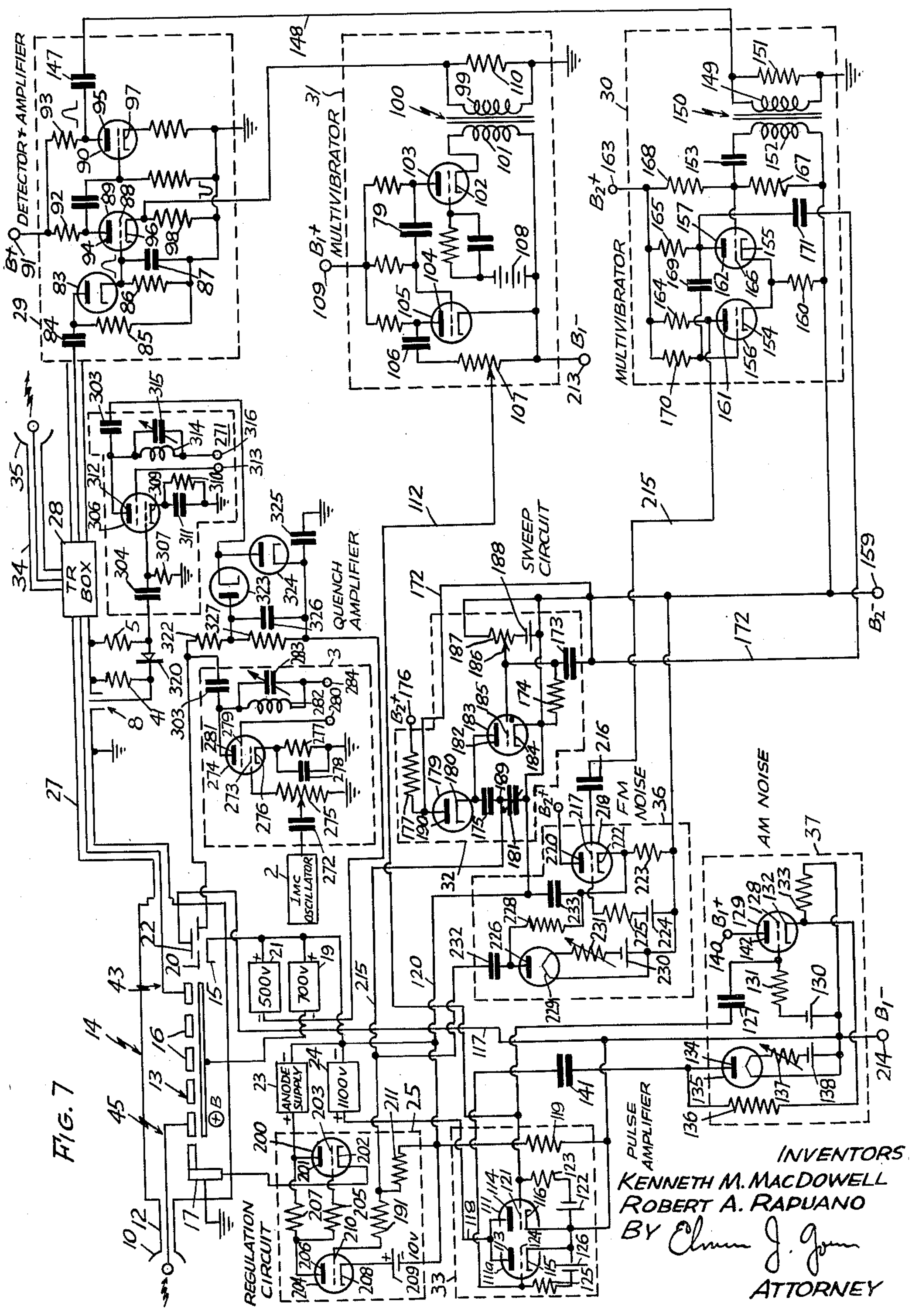
FIG. 7 is a circuit diagram illustrating a preferred manner of practicing the invention.

Referring now to FIG. 7, there is shown a circuit diagram of a preferred circuit embodiment of the system described generally in FIG. 6. In FIG. 7, where the elements are shown in FIGS. 1, 3 and 6, the same reference numbers are used. In FIG. 7, the radio signals which are to be amplified by backward wave tube 14 are brought from antenna 10 by means of a coaxial line 12 to the input coupling assembly 45 of the traveling wave tube. With the tube 14 operating in the amplifying or regenerative mode by application of a proper value of accelerating anode voltage from anode supply 24 to maintain the anode current below the $I_0$ value required for oscillation, the amplified signal output of tube 14 is fed through output coupling means 43 and coaxial line 27 to a duplexer comprising a conventional TR box 28 operating to prevent radiation of the received signal by coaxial cable 34 into radiating antenna 35 and to feed the amplified signal to a conventional detector and amplifier circuit 29.

Superregenerative operation of tube 14 is provided by feeding the one megacycle sine wave output of the oscillator 2 to the quench amplifier 3, as shown in FIG. 1. The output of quench amplifier 3 is coupled through the .1 microfarad capacitor 303 to the grid 20 of tube 14. In order to provide automatic sensitivity control over the sweep frequency band, the quench signal component from the probe 8 and crystal detector 320 is coupled to the input capacitor 304 of the multi-stage amplifier 272, the circuit diagram of which is shown in FIG. 3. However, the broad banding resistor across the tuned plate circuit has been removed to achieve higher gain over a narrower bandwidth. The amplified quench signal component is fed to a voltage doubler circuit comprising a pair of 6AL5 type diodes 323 and 324. The latter diode provides a direct current return path for the coupling capacitor 303 and can be isolated from the grounded coaxial line by means of a coupling capacitor 325. Diode 323 is poled in a manner which will provide a negative charge on capacitor 326. The rectified quench signal component charges capacitor 326 to a value which will limit or reduce the beam current in tube 14 to a value which will not sustain oscillation. After a predetermined time, the negative direct current charge is dissipated by the 100,000 ohm resistor 327 and the beam current returns to the original value. Isolation resistor 322 decouples the rectified automatic sensitivity control voltage from the amplified quench voltage output of quench amplifier 3. Thus, the grid 20 of tube 14 is driven more negative by an increase in rectified quench signal at the input of automatic signal control amplifier 273. It should be understood that the time constant of the capacitor 326 and resistor 327 is substantially greater than the period of the one megacycle amplifier 3 and substantially less than the period of the cyclical sweep of tube 14. It should also be understood that alignment error of the transmitter frequency, during oscillation of tube 14, with respect to the received frequency of that tube is eliminated because, as is noted, the backward wave tube always radiates at any power level at substantially the same frequency as that of the bandpass center of the superregenerative amplifier.

The detector and amplifier circuit 29 forming part of the signal receiving means may, for example, consist of a standard pulse-radar receiver, the output of which is a detected high-frequency signal. As shown, the conventional diode detector circuit includes a coupling capacitor 84 and a coupling resistor 85 providing a high impedance circuit for the detector diode 83. The detected output signal appears across diode resistor 86 and capacitor 87 and is fed to the input grid 88 of a twin-triode amplifier including input triode tube 89 and output triode tube 90. The amplifier tubes are supplied with a positive voltage applied to terminal 91 and coupled through plate load resistors 92 and 93 to amplifier plates 94 and 95 and amplifier cathodes 96 and 97, respectively. A negative signal produced across cathode resistor 98 is fed to a primary winding 99 of acceleration anode isolation transformer 100, while the secondary winding 101 feeds pulse amplifier circuit multivibrator 31.

The basic plate-to-grid-coupled monostable multivibrator 31, generally referred to as a "flip-flop," is triggered by applying a negative trigger voltage to the cathode 102 of input tube 103 and produces, according to well-known multivibrator operation and, in particular, according to the value of timing capacitor 79, a rectangular positive output voltage of a predetermined duration at the plate 104 of multivibrator output tube 105. The predetermined duration of the rectangular output voltage which is coupled to capacitor 106 and level setting or coupling potentiometer 107 determines the length of time tube 14 is maintained in the oscillatory mode of operation upon the reception of an appropriate input signal. Multivibrator 31 is provided with a fixed bias source 108 and a separate source of plate voltage, which, for convenience, is designated $B_1+$. This voltage is applied to terminal 109 and isolated from the voltage applied to terminal 91 of the amplifier and detector. It should be noted that input transformer 100 is, preferably, insulated to withstand a voltage of approximately ten kilovolts. It should also be noted that primary winding 99 and impedance matching resistor 110 have one terminal thereof grounded, while the remainder of the multivibrator circuit including the secondary of isolation transformer 100 is pulsed upward by the acceleration electrode supply 24 and the pulse amplifier tube 111, in a manner which will be described in detail below.

The output of gating multivibrator 31 is applied by way of line 112 to the input of pulse amplifier circuit 33. This circuit includes a pair of heavy duty triodes 111 and 111*a*, such as 2C53 type tubes having plates 113 and 114 and cathodes 115 and 116 coupled in parallel arrangement and operating as amplifier tubes for pulsing acceleration anode 22 of tube 14 by way of pulse line 117. The plates 113 and 114 are connected to the 1100 volt supply via plate line 118. The high voltage output pulse developed across cathode follower output resistor 119 is connected by way of negative voltage line 120 to the negative side of pulse amplifier supply 24 and anode supply 23. In operation, a positive rectangular pulse is applied to grid 121 of tube 111 maintained negative and below cutoff with respect to cathode 116 by means of fixed bias supply 122 and bias resistor 123. In like manner, grid 124 is biased negatively to slightly below cutoff by bias resistor 125 and fixed bias supply 126 connected from grid to cathode. This tube 111*a* is used, at appropriate time intervals, to apply to tube 14 an amplitude modulated noise pulse from AM noise source 37. Thus, in response to an incoming or object signal, a positive rectangular voltage is applied to grid 121 of the pulse amplifier tube 111, which conducts and applies a positive-going pulse to the acceleration anode 22 to initiate oscillation in tube 14 for a predetermined time interval. This positive pulse applied to grid 121 is also applied by way of coupling capacitor 127 to the grid 128 of a noise gate tube 129, which is biased negatively by fixed bias source 130 and bias resistor 131. Cathode 132 of the noise tube 129 applies a positive rectangular pulse produced across cathode resistor 133 to the plate 134 of noise tube 135 by way of noise loop resistor 136. The amplitude modulated noise tube 135 may be a temperature-limited noise diode, the degree of noise being controlled by noise potentiometer 137 in series with noise filament supply 138. Thus, noise is produced across the noise loop resistor 136 which may have a value of approximately 100,000 ohms. The plate 142 of the noise gate tube 129 is connected to a positive source of voltage applied to terminal 140. The voltage source may, for convenience, be the same as that applied to positive terminal 109. The noise output produced at the plate 134 of noise tube 135 is fed through coupling capacitor 141 to the grid 124 of pulse amplifier tube 111*a*, thereby to vary the conductivity of said tube in relation to the amplitude-modulated noise voltage present at its grid and, in turn, to apply an amplitude modulated noise voltage to acceleration electrode 22. Thus far, the means for transmitting an amplitude modulated noise signal in response to an incoming signal have been described; the operation of the voltage-tuned frequency scanning and locking circuit will be described in detail below.

Referring again to FIG. 7, a positive voltage gate pulse is coupled from plate 95 of amplifier tube 90 and fed by way of coupling capacitor 147 and sweep gate line 148 to the primary winding 149 of sweep circuit isolation transformer 150. Primary winding 149 of transformer 150 and impedance matching resistor 151 have one terminal thereof grounded. The transformer 150 is, preferably, insulated to withstand a voltage of approximately ten kilovolts. A positive gate pulse from secondary winding 152 is coupled to sweep circuit multivibrator tube 157 by coupling capacitor 153. The cathodes 154 and 155 of multivibrator tubes 156 and 157, respectively, are connected through cathode resistor 160 to negative terminal 159, which, for convenience, may be referred to as $B_2-$. Multivibrator tubes 156 and 157 have plates 161 and 162 connected to a separate source of positive potential at terminal 163, referred to as $B_2+$, by means of plate resistors 164 and 165, respectively. Thus, when multivibrator circuit 30 and, more particularly, grid 166 are fed with a positive trigger pulse applied to the junction of biasing resistors 167 and 168, a negative rectangular output voltage is produced at the plate 162 of tube 157, the duration of the output being determined in part by the value of timing condenser 169 and timing resistor 170. The negative square wave output, taken from plate 162 of tube 157, is connected through coupling capacitor 171 and sweep timing line 172 to differentiation capacitor 173 and differentiation resistor 174 in the input of sweep circuit 32. The differentiated output of the negative square wave is used to determine the firing time of the sweep thyratron tube 183 at the end of the noise and oscillation period initiated by an incoming signal. This oscillation period is determined by the width of the multivibrator pulse.

Referring in particular to sweep generator circuit 32, sweep charging capacitor 175 which, with capacitor 181, determines the frequency band over which tube 14 is swept, is charged by means of a positive potential applied to terminal 176, which, for convenience, may be the same $B_2+$ source that feeds terminals 163. The voltage applied to terminal 176 is connected through resistor 177 to the plate 190 of charging diode 179. The cathode 180 of the charging diode is connected to one side of sweep charging capacitor 175 and then to charging capacitor 181. Capacitors 175 and 181 act as a voltage divider to set a sweep amplitude limit for the regulation circuit. The cathode of diode 179 also is connected to the plate 182 of thyratron discharge tube 183, the cathode 184 of which is connected to the negative side of sweep capacitor 181. In order for the discharge devices 179 and 183 to operate as a sawtooth generator, the condensers 175 and 181 must charge through the diode 179 and resistor 177. The grid 185 of gaseous discharge tube 183 is connected to the tap 186 of a bias potentiometer 187. One end of potentiometer 187 is connected to the negative terminal 159 and the other end thereof is connected to a source of negative potential 188, which sets the firing point of gaseous discharge tube 183.

The operation of sweep circuit 112 will now be described. Assume the gaseous discharge tube 183 has just fired. The condensers 175 and 181 discharge rapidly through the gaseous discharge tube 183 until the potential difference thereacross is sufficiently low to extinguish the discharge tube. When the discharge tube becomes extinguished, the grid 185 thereof regains control and prevents firing of the discharge tube. The condensers 181 and 175 begin to charge from the source of negative potential at terminal 159 to one side of the condenser 181, through the common connection of condenser 181 and 175, thence, from the other side of the condenser 175 through the diode 179 and resistor 177 to the source of positive potential at terminal 176. As the potential across condensers 175 and 181 rises, the voltage at midpoint 189 of the condensers also rises, and this rising voltage is fed by line 215 to the regulation circuit 25 to control the frequency band through which tube 14 is swept. Since the charging current remains substantially constant, the potential difference between the cathode 184 and the grid 185 of the gaseous discharge tube 183 remains substantially constant. However, the potential difference between the plate 182 and the cathode 184 of the gaseous discharge device 183 increases as the charge developed across condensers 175 and 181 increases until a point is reached where the grid loses control as a result of ionization and the tube 183 fires. This again discharges the condensers 175 and 181, thereby terminating the generation of one sawtooth waveform and initiating generation of the next. The variable charging condenser 181 sets the grid-cathode voltage of tube 204 in regulation circuit 25 and determines the limits of the band of frequencies over which tube 14 sweeps. By adjusting the variable tap 186 of potentiometer 187, the point at which the discharge tube 183 fires may be set, thereby adjusting the amplitude of the sweep. Thus, in the absence of a signal, condensers 175 and 181 are permitted to charge through diode 179 and charging resistor 177.

However, upon reception of an object signal, the negative square wave output in line 172 is differentiated to produce a negative-going spike corresponding to the initial drop in voltage followed by a positive spike corresponding to the trailing edge of the square wave. It is this positive spike which is fed to grid 185 of discharge tube 183, causing the discharge tube to conduct heavily and discharge condensers 175 and 181, thus terminating the generation of one sawtooth waveform and initiating generation of the next series of sweeps. Additionally, upon the presence of a signal during the charging time of condensers 175 and 181, a negative square wave from line 172 occurs early in the sweep cycle to cut off diode 179 by lowering the plate potential momentarily with respect to the cathode 180. Since the cathode 180 is made positive with respect to the diode plate 190, the diode will not conduct. Hence, condensers 175 and 181 can charge no further through the charging circuit. Under these conditions, the sawtooth generator is disabled, and the condensers 175 and 181 are held at the voltage level present when the signal occurred. Thus, it may be seen that the system automatically switches the backward wave tube from sweeping operation to locking operation upon the arrival of an object signal.

It should be noted that, in the presence of an object signal, the trailing edge of the differentiated negative square wave output of multivibrator tube 157 forms a positive trigger pulse which is applied to grid 185 of discharge tube 183 to discharge the sweep condensers at the completion of each noise period, and that the differentiated leading edge is ineffective to cut off discharge tube 183. However, as noted, upon the presence of an object signal during the sweeping period, the negative leading edge of the square wave from multivibrator circuit 30 is connected by way of line 172 to the plate 190 of diode 179, thereby cutting off the diode and disabling the sawtooth generator at a voltage level substantially corresponding to the frequency of the object signal.

The regulation circuit 25 controls the voltage applied from anode supply 23 to the anode line 13 of tube 14. The regulation circuit includes regulator or control tube 200 having a plate 201 connected to the positive terminal of anode supply 23 and a cathode 202 connected to anode 13. The voltage from plate to cathode of tube 200 is controlled by the voltage produced at plate 206 of amplifier tube 204 and is applied through isolation resistor 205 to grid 203. Tube 200 is, preferably, a heavy duty regulator, such as a 2,000 T-type tube. The plate 206 of tube 204 is connected to a plate resistor 207 while the cathode 208 is connected to a fixed bias source 209 of approximately ten volts and also to grid resistor 211 of approximately ten megohms. The sweep voltage from capacitor 181 is applied across this resistor, which is of a large value to prevent discharge of the sweep capacitor 181 during the noise-oscillation period. When grid 210 of the control tube 204 receives a control voltage by the way of line 215 and isolation resistor 191, it conducts and lowers the voltage at its plate 206 and also, at grid 203 which, in turn, causes regulator tube 200 to conduct less heavily, thereby lowering the voltage applied to collector anode 17. In this manner, control tube 204 performs a sensitive control function in response to voltage changes applied to its grid from the midpoint 189 of charging capacitors 175 and 181. As shown, the lower plate of charging capacitor 181 is connected by way of negative lead 120 to the negative terminal of the bias source 209 to the negative terminal of anode supply 23 and accelerator power source 24, cathode 15, and, also, to terminal 159. In addition, negative terminals 213 and 214, $B_1-$, can be supplied by the same power source, and are isolated from negative terminal 159. It should also be noted that the voltage at terminal 159, and also at terminals 176 and 163, $B_2+$, moves up and down in value with respect to ground corresponding to the voltage swings produced by the anode regulation circuit 25 which controls the frequency of tube 14. It has been established that, for best operating efficiency, the sole-to-cathode voltage of tube 14 should be held to approximately 700 volts. When the cathode-to-ground voltage of tube 14 is changed, the operating frequency of the tube is also changed by a corresponding change in the sole-to-ground voltage. Accordingly, isolation transformers 100 and 150 are required to isolate the multivibrator and sweep circuits from ground potential during the aforementioned substantially wide voltage swings. Thus, in sweeping a given frequency range, a cathode voltage of approximately −2,000 to −5,000 volts with respect to ground is required, while the input voltage in response to the charging of capacitors 175 and 181 may vary only to the extent of five to ten volts at the grid 210 of control tube 204. Also, as noted, this control voltage is held substantially constant at a predetermined level when diode 179 is cut off in response to an incoming signal to amplifier 29, and, thus, in accordance with the invention, tube 14 is made to lock at the frequency of an object signal and its acceleration anode pulsed to initiate oscillations within the tube 14, thereby to transmit a response signal by way of coaxial cable 27 and the TR box 28 to radiating element 35.

Additionally, frequency modulated noise is accomplished by connecting the output of FM noise generator 36 to grid 210 of amplifier tube 204 in regulation circuit 25. A positive square wave produced at plate 161 of multivibrator tube 156 is connected by way of noise line 215 and coupling capacitor 216 to the grid 217 of noise gate tube 218. The latter tube is provided with a plate 220 connected to $B_2+$ terminal 221 which, for convenience, may be the same voltage source as that which supplies terminals 163 and 176. Cathode 222 is connected to resistor 223. A positive pulse is applied to grid 217 of cathode follower tube 218 to override the negative source of bias 224 applied to the grid 217 through bias resistor 225. Voltage produced across cathode follower resistor 223 supplies voltage for the plate 226 of noise tube 227 through plate load resistor 228. Filament 229 is fed by voltage source 230 through variable control resistor 231 which is adjusted for a desired value of noise, these elements completing a noise loop through resistor 223, resistor 228 and the plate 226 of noise tube 227. The noise voltage produced across resistor 228 is coupled by way of coupling capacitor 232 to the grid of amplifier tube 204 through isolation resistor 191, thereby producing a wide band noise-modulated signal in tube 14.

It should be noted that by means of a negative lead coupling capacitor 233, only the noise produced across resistor 228 is applied to the grid 210 of tube 204, rather than a noise-modulated pulse as obtained from series-connected resistors 133 and 136 in the AM noise circuit 37. This arrangement prevents the pulsing of grid 210 of tube 204, thereby preventing any substantial frequency deviation of tube 14 from the object signal during the application of FM noise. Additionally, TR box 28 operates in the conventional manner to prevent radio frequency energy from entering the detector and amplifier circuit 29.

This completes the description of the modification of the invention disclosed herein. However, many variations thereof will be apparent to persons skilled in the art. For example, the invention is not limited to a system in which superregeneration is applied to the grid of a backward wave oscillator which is self-quenched or separately quenched and voltage tuned over a wide range of frequencies by varying the electron beam velocity or by separate adjustment of the transverse magnetic field strength in those oscillator tubes employing a transverse magnetic field, but rather, the invention further contemplates applying superregeneration to other electrodes and the use of mechanical means for changing the geometry of the signal transmission network of one or more of said tubes to permit matching of the phase velocity of the backward wave with that of the electron beam velocity.

It further contemplates the use of conventional linear beam backward wave amplifier-oscillator tubes which do not require the use of a transverse magnetic field. Also, different sweeping circuits could be used to control the frequency of one or more oscillator tubes, such as tube 14. Other types of noise sources could be used or eliminated in place of the particular arrangement shown here. It is, accordingly, desired that the appended claims be given a broad interpretation commensurate with the scope of the invention within the art.

What is claimed is:

1. In combination, an electron signal amplifying device having a travelling wave interaction between an electron stream and signal waves in which signal energy producing said interaction moves in a direction opposite to the movement of said electron stream, means for cyclically rendering said device oscillatory and non-oscillatory, means for introducing a signal into said device, and means for extracting a signal from said device.

2. In combination, an electron signal amplifying device having a travelling wave interaction between an electron stream and signal waves in which signal energy producing said interaction moves in a wave interaction path opposite to the movement of said electron stream, said wave interaction path having a reflectionless termination at each end of said path, means for cyclically rendering said device oscillatory and non-oscillatory, means for introducing a signal into said device, and means for extracting a signal from said device.

3. In combination, a backward wave device having an oscillatory mode and an amplifying mode of operation, said device including a wave interaction path having a reflectionless termination at each end of said path, means for applying a source of signals to said wave interaction path, means for cyclically interrupting said oscillatory mode of operation of said device, and means for extracting said signals from said interaction path.

4. In combination, a backward wave device having an oscillatory mode and an amplifying mode of operation, said device including a wave interaction path having a reflectionless termination at each end of said path, means for applying a source of modulated signals to said wave interaction path, means for cyclically interrupting said oscillatory mode of operation of said device, and means for extracting said modulated signals from said interaction path.

5. In combination, a backward wave voltage tunable device having an oscillatory mode and an amplifying mode of operation, said device including a wave interaction path having a reflectionless termination at each end of said path, means for cyclically quenching oscillations of said device when no signal is applied to said wave interaction path, a source of modulated signals for advancing the starting time of said oscillatory mode, and means for extracting said modulated signals from said wave interaction path.

6. In combination, a backward wave voltage tunable device having a mode for amplifying and mode for transmitting electromagnetic energy, said device including an input coupling and a wave interaction path, a source of signals applied to said input coupling, means for rendering said device oscillatory in response to said input signals, means for quenching said oscillation after a predetermined time, and means for extracting signals from said device.

7. In combination, a backward wave signal amplifying device including an input and an output coupling and a wave interaction path having a reflectionless termination adjacent said input and said output coupling, a source of signals applied to said input coupling, means for rendering said device oscillatory in response to said input signals, means for quenching said oscillation after a predetermined time, and means for extracting signals from said device.

8. In combination, a backward wave signal amplifying device having a travelling wave interaction between an electron stream and signal waves in which signal energy producing said interaction moves in a direction opposite to the movement of said electron stream, quenching means for cyclically rendering said device oscillatory and non-oscillatory, means for continuously and cyclically tuning said device through a predetermined frequency range, means for introducing a signal into said device, means for halting tuning of said device upon reception of said introduced signal, said introduced signal advancing the time of said cyclical oscillation of said device, and means for extracting an amplified signal from said device.

9. In combination, a backward wave voltage tunable amplifying device having an oscillatory mode and an amplifying mode of operation, said device including a wave interaction path having a reflectionless termination at each end of said path, means for applying a source of signals at one end of said wave interaction path, means for cyclically quenching said oscillatory mode of operation to amplify said signals in the non-oscillatory mode of operation, and means for extracting said amplified signals from the other end of said wave interaction path.

10. In combination, a backward wave voltage tunable amplifying device having an oscillating mode and an amplifying mode of operation, means for applying a source of signals to said amplifying device in said amplifying mode, means for advancing regeneration in said device to a value in which said device produces a low frequency oscillation simultaneously with the frequency of said oscillatory modes whereby said device becomes self-quenching, and means for extracting said signals from said amplifying device.

11. The method of providing superregenerative signal amplification in a voltage tunable backward wave device having an amplifying and an oscillatory mode of operation including the steps of introducing a signal into said device in said amplifying mode of operation, advancing the time of oscillation of said device in response to said signals, quenching said oscillatory mode of operation after a predetermined time and extracting said signals from said device.

12. The method of alternatively providing superregenerative signal amplification and oscillation in a voltage tunable backward wave device having an amplifying and an oscillatory mode of operation including the steps of sweeping said device through a predetermined frequency range, stopping said sweeping of said device upon encountering an object signal, rendering said device oscillatory in response to said object signal, quenching said oscillation at a predetermined time whereby said object signal is amplified during the unquenched mode of said device, extracting said amplified signals from said device, and generating in response to said signals a continuous wave oscillatory output from said device at substantially the frequency of said object signal.

13. In combination, a backward wave voltage tunable device having an amplifying and an oscillatory mode of operation, said device including a wave interaction path having a reflectionless termination at each end of said path, a source of modulated signals for advancing the starting time of said oscillatory mode, means for extracting and rectifying a portion of said signals from said interaction path, and means for feeding back said rectified signals to quench said backward wave device at predetermined intervals.

14. In combination, a backward wave voltage tunable device having a mode for amplifying and a mode for transmitting electromagnetic energy, said device including a wave interaction path having a reflectionless termination at each end of said path, means for forming an electron stream which flows along said path, means for cyclically quenching oscillation of said device, and means in response to the amplitude of said amplified electromagnetic energy for controlling said electron stream whereby the sensitivity of said device is substantially constant over a predetermined frequency band.

15. An electrical system for receiving and transmitting electromagnetic energy comprising a backward wave voltage tunable device tunable through a predetermined frequency range having means for receiving and transmitting electromagnetic energy, means for initiating oscillation in said backward wave device, means for interrupting said oscillation at predetermined intervals in response to a separate source of oscillations, means for cyclically tuning said device through a predetermined frequency range at a slower rate of sweep than the period of said interrupting oscillations, means for halting tuning of said device upon reception of electromagnetic energy by said receiving means, and means responsive to said received electromagnetic energy to render said transmitting means operable to produce an electromagnetic energy output at substantially the same frequency as said received energy.

16. In combination, a backward wave amplifying device having first and second input and output terminals, means for feeding electromagnetic energy to said input terminals, means for initiating oscillation in said backward wave device, means for interrupting said oscillations at predetermined intervals, means for extracting electromagnetic energy from said device at said output terminals, means for detecting a portion of said electromagnetic energy, means for amplifying said portion of said detected electromagnetic energy, and means for actuating said interrupting means in response to said amplified portion of electromagnetic energy.

17. An electrical system for receiving and transmitting electromagnetic energy comprising a backward wave voltage tunable device tunable through a predetermined frequency range having means for feeding electromagnetic energy into said device, means for initiating oscillation in said backward wave device, means for interrupting said oscillation at predetermined intervals, means for advancing the starting time of said oscillation in response to said electromagnetic energy, means for cyclically tuning said device during said interruption through a predetermined frequency range, means for halting tuning of said device upon reception of electromagnetic energy, and means responsive to said received electromagnetic energy to render said transmitting means operable to produce an electromagnetic energy output at substantially the same frequency as said received energy.

18. In combination, a backward signal amplifying device having a travelling wave interaction between an electron stream and signal waves in which signal energy producing said interaction moves in a wave interaction path opposite to the movement of said electron stream, said wave interaction path having a reflectionless termination at each end of said path, means for cyclically rendering said device oscillatory and non-oscillatory, means for introducing a signal into said device, means for extracting signals from the wave interaction path of said device, means for rectifying a portion of said extracted signals, means for amplifying said rectified signals, and means for feeding said amplified signals back to said wave interaction path to control the amplitude of said extracted signals.

19. In combination, a backward signal amplifying device having a travelling wave interaction between an electron stream and signal waves in which signal energy producing said interaction moves in a wave interaction path opposite to the movement of said electron stream, said wave interaction path having a reflectionless termination at each end of said path, means for cyclically rendering said device oscillatory and non-oscillatory, means for introducing a signal into said device, means for extracting signals from the wave interaction path of said device, means for rectifying a portion of said extracted signals, means for feeding said rectified signals back to said wave interaction path to control the amplitude of said extracted signals, means for cyclically tuning said device through a predetermined frequency range, means for halting tuning of said device at the frequency of a signal in said wave interaction path, and means for initiating oscillation in said device in response to said signal.

References Cited in the file of this patent

UNITED STATES PATENTS

| | | |
|---|---|---|
| 2,676,246 | Rinia | Apr. 20, 1954 |
| 2,843,733 | Harrison | July 15, 1958 |